(12) United States Patent
Chung et al.

(10) Patent No.: US 9,935,757 B2
(45) Date of Patent: Apr. 3, 2018

(54) CHANNEL QUALITY REPORTING FOR FULL-DUPLEX RADIO

(71) Applicant: NATIONAL INSTRUMENTS CORPORATION, Austin, TX (US)

(72) Inventors: MinKeun Chung, Austin, TX (US); Jaeweon Kim, Cedar Park, TX (US); James W. McCoy, Leander, TX (US); Ahsan Aziz, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 173 days.

(21) Appl. No.: 14/941,158

(22) Filed: Nov. 13, 2015

(65) Prior Publication Data

US 2017/0141886 A1 May 18, 2017

(51) Int. Cl.
| | |
|---|---|
| *H04L 12/50* | (2006.01) |
| *H04L 5/00* | (2006.01) |
| *H04L 5/14* | (2006.01) |
| *H04W 72/04* | (2009.01) |
| *H04W 72/08* | (2009.01) |

(52) U.S. Cl.
CPC ............. *H04L 5/006* (2013.01); *H04L 5/14* (2013.01); *H04W 72/0406* (2013.01); *H04W 72/082* (2013.01)

(58) Field of Classification Search
CPC ........................................ H04L 5/006
USPC ............................................. 370/278
See application file for complete search history.

(56) References Cited

U.S. PATENT DOCUMENTS

2015/0229461 A1\* 8/2015 DiFazio ................... H04L 5/14
370/280

OTHER PUBLICATIONS

3GPP: Technical Specification—3GPP TS 36.121 v12.6.0: 3rd Generation Partnership Project; Technical Specification Group Radio Access Network; Evolved Universal Terrestrial Radio Access (E-UTRA); Multiplexing and Channel Coding—Release 12; Sep. 2015; pp. 1-95; 3GPP Organizational Partners—Valbonne, France (95 pages).

(Continued)

*Primary Examiner* — Dang Ton
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to channel quality reporting for full-duplex (FD) wireless communications. In some embodiments an apparatus (e.g., a mobile device) is configured to receive a reference signal in a wireless communication and determine an effective signal to interference plus noise ratio (SINR) for FD communications based on a measured SINR of the reference signal and one or more self-interference cancelation levels. The apparatus may determine the one or more self-interference cancelation levels based on the transmit power of signals transmitted by the apparatus and residual power after SIC. The SIC levels may include both analog and digital SIC levels, which may be separately determined. One or more modulation and coding schemes may be determined based on the effective SINR. In some embodiments, multiple effective SINRs are determined for multiple different transmission modulation orders used by the apparatus.

17 Claims, 5 Drawing Sheets

(56) References Cited

OTHER PUBLICATIONS

Choi et al.—"Achieving Single Channel, Full Duplex Wireless Communication" Proceedings of the Sixteenth Annual International Conference on Mobile Computing and Networking (MobiCom '10); Sep. 2010, pp. 1-12; Association for Computing Machinery (ACM), New York, NY, USA (12 pages).

* cited by examiner

CHANNEL QUALITY REPORTING FOR FULL-DUPLEX RADIO

TECHNICAL FIELD

This disclosure relates to wireless communication systems and more particularly to full-duplex radio communications.

DESCRIPTION OF THE RELATED ART

Wireless communication systems are rapidly growing in usage. Further, wireless communication technology has evolved from voice-only communications to also include the transmission of data, such as internet and multimedia content. The proliferation of wireless communications may lead to a scarcity of frequency spectrum. Techniques to improve spectrum utilization may be desired.

Full-duplex (FD) radio is an area of active research at the forefront of developing wireless technology. FD radio involves a device transmitting and receiving radio signal at the same time, using the same frequency resources. This is in contrast to conventional techniques for emulating full-duplex communication, in which transmission and receiving are performed using different time slices (time dimension duplexing) or different frequency resources (frequency dimension duplexing), for example. FD communications may advantageously increase spectrum utilization. During FD communications, however, the transmitted radio signals may interfere with received signals. Therefore, FD radio typically involves self-interference cancellation to isolate the transmitted signal and accurately detect received signals. Traditional techniques for reporting channel quality may be insufficient in the context of communications between devices configured to perform self-interference cancelation.

SUMMARY

Techniques are disclosed relating to reporting channel quality information in a full-duplex wireless system. In some embodiments, an apparatus includes one or more processing elements that are configured to receive a reference signal in a wireless communication and determine an effective signal to interference plus noise ratio (SINR) for full-duplex (FD) communications based on the reference signal. In some embodiments, the effective SINR is determined based on a measured SINR of the reference signal and one or more measured self-interference cancelation (SIC) levels. In some embodiments, the apparatus is configured to determine the measured SINR of the reference signal during a time interval in which the apparatus is configured to wirelessly transmit using time and frequency resources that at least partially overlap with time and frequency resources of the reference signal. The one or more measured SIC levels may or may not be determined based the transmissions by the apparatus that are sent while receiving the reference signal. The apparatus may include both analog and digital SIC circuitry and the measured SIC levels may include both an analog SIC level and a digital SIC level. In some embodiments, the apparatus is configured to determine multiple effective SINRs based on determined SIC levels corresponding to multiple different modulation orders used for wireless transmission.

In some embodiments a method (which may be performed by a base station, for example) includes transmitting a reference signal for FD wireless communication, receiving one or more channel quality indicators in a wireless communication from a receiving computing device, and selecting one or more modulation and coding schemes for subsequent FD wireless communications. In some embodiments, the received channel quality indicator(s) are determined based on both a measured SINR of the reference signal and one or more SIC levels of the receiving computing device. In some embodiments, the modulation and coding scheme(s) include different schemes for uplink and downlink transmissions. In some embodiments, the modulation and coding scheme(s) are selected to increase overall spectral efficiency. In some embodiments, the method also includes receiving information indicating a SIC classification for the receiving device and the modulation and coding scheme(s) are further determined based on this information.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
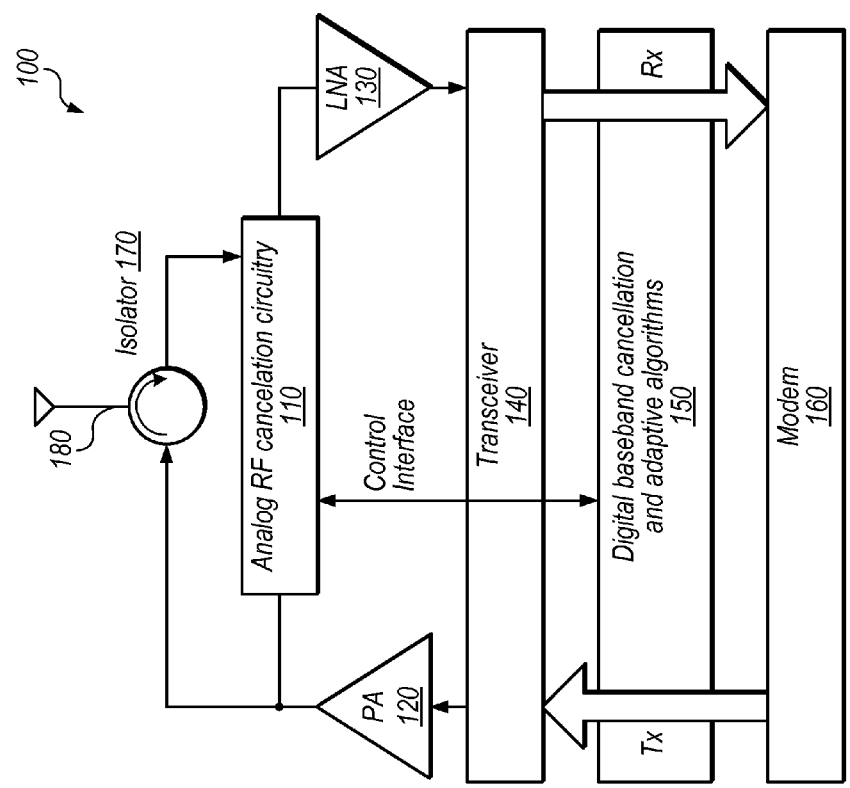
FIG. 1 is a block diagram illustrating exemplary full-duplex radio circuitry, according to some embodiments.
Figure 2:
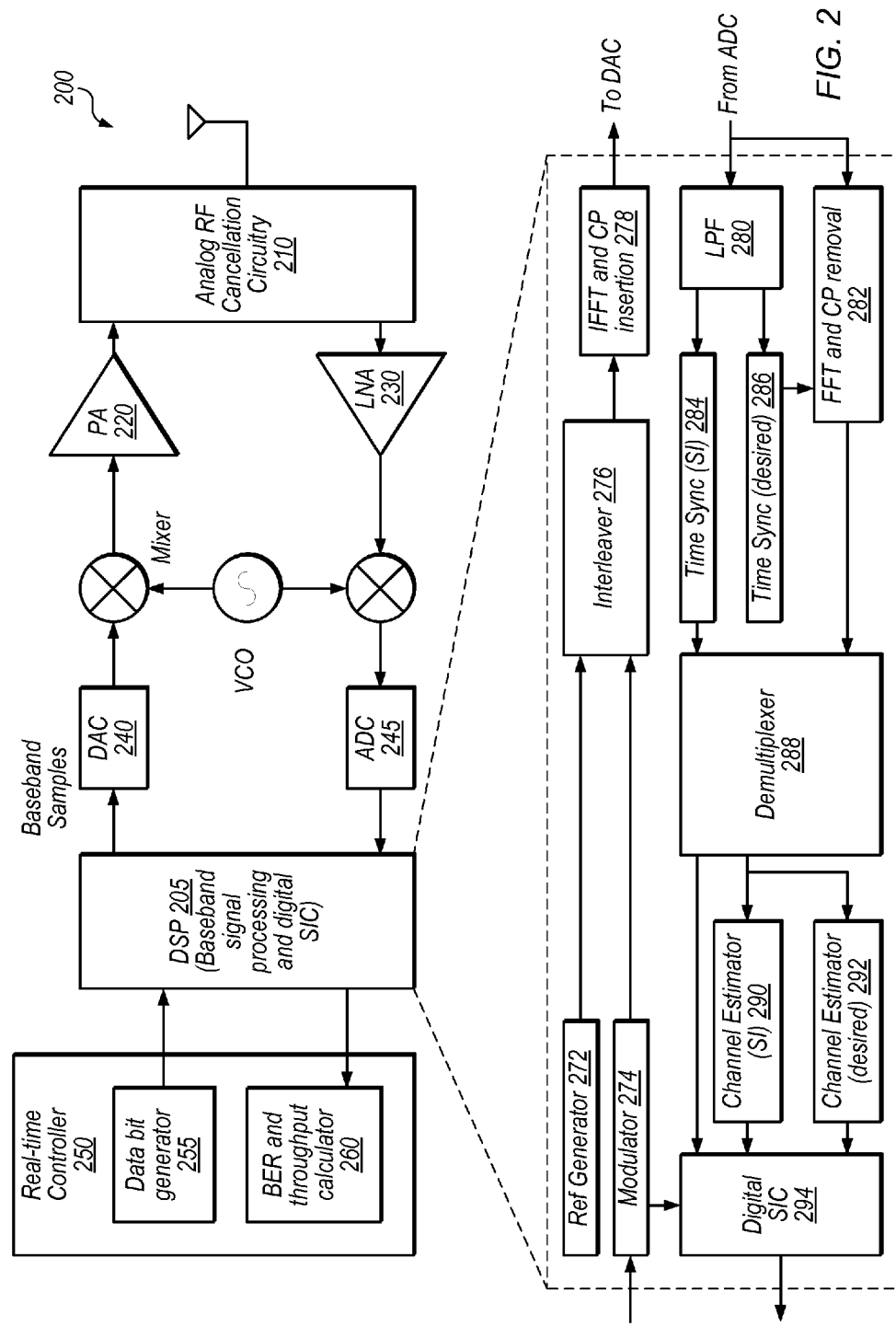
FIG. 2 is a block diagram illustrating a more detailed example of full-duplex radio circuitry, according to some embodiments.

This disclosure initially describes, with reference to FIGS. 1-2, an overview of full-duplex (FD) radio techniques. Exemplary techniques for determining and reporting channel quality for FD communications are discussed with reference to FIGS. 3-6. In some embodiments, the disclosed techniques may improve channel quality reporting by taking into account self-interference cancelation capabilities of communicating devices.

Acronyms

The following acronyms may be used in the present disclosure.

3GPP: Third Generation Partnership Project
AMC: Adaptive modulation and coding
CDMA: Code Division Multiple Access
CQI: Channel quality indicator
DL: Downlink
EVM: Error vector magnitude
FD: Full Duplex
FFT: Fast Fourier Transform
FPGA: Field Programmable Gate Array
GSM: Global System for Mobile Communications
LTE: Long Term Evolution
MIMO: Multiple Input Multiple Output
OFDM: Orthogonal Frequency-Division Multiplexing
PAPR: Peak-to-average power ratio
RAT: Radio Access Technology
RF: Radio Frequency
RX: Receive
SDR: Software Defined Radio
SI: Self-interference
SIC: Self-interference cancellation
SINR: Signal to interference plus noise ratio
TX: Transmit
UE: User Equipment
UL: Uplink
UMTS: Universal Mobile Telecommunications System
WCDMA: Wideband Code Division Multiple Access Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "User Device")—any of various types of computer systems devices which are mobile or portable and which performs wireless communications. Examples of User devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "User device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Full-Duplex Radio Overview

FIG. 1 shows an exemplary full-duplex (FD) radio device 100, according to some embodiments. In the illustrated embodiment, device 100 includes analog RF cancelation circuitry 110, power amplifier (PA) 120, low-noise amplifier (LNA) 130, transceiver 140, digital baseband cancellation and adaptive algorithms module 150, modem 160, isolator 170, and antenna 180.

In the illustrated embodiment, device is configured to simultaneously transmit and receive wireless radio signals via antenna 180 using at least partially overlapping frequency resources, resulting in FD communications. In some embodiments, device 100 may include multiple antennas, and one or more antennas may be used for exclusively transmission and another one or more other antennas exclusively for reception. In some embodiments, various analog front-end isolation circuitry (e.g., such as isolator 170 and circuitry 110) may be implemented to reduce interference. Even if using different antennas for transmission and reception, to successfully decode transmissions from other devices, it is typically necessary to further cancel out signals transmitted by device 100 (which may be referred to as self-interfering signals). In the illustrated embodiment, analog RF cancelation circuitry 110 is configured to perform analog cancelation of self-interfering signals (which may avoid receiver saturation) while module 150 (which may be implemented by a digital signal processor (DSP) for example) is configured to perform digital cancelation, e.g., based on modeling linear and/or non-linear distortions of self-interfering signals. This may enable decoding of over-the-air wireless signals from other devices.

PA 120, in some embodiments, is configured to amplify a low-power radio-frequency (RF) signal from transceiver 140 in order to drive a signal via antenna 180. LNA 130, in the illustrated embodiment, is configured to amplify weak signals from antenna 180, after cancellation by circuitry 110, for further processing. LNA 130 may be designed to have low-noise characteristics because the gain of LNA 130 may reduce the noise of later stages of the receive chain while noise from LNA 130 may be directly injected into the received signal. Isolator 170, in the illustrated embodiment, may itself reduce self-interference by as much as 20-30 dB, in some embodiments. Transceiver 140 and modem 160 may be configured according to any of various radio implementations and may be configured to convert between analog and digital data and transmit/receive bit streams.

The illustrated embodiment of FIG. 1 is included for illustrative purposes but is not intended to limit the scope of the present disclosure. In other embodiments, any of various FD radio implementations may be used.

The modulation and coding scheme used for wireless transmissions typically sets out both (1) the type and order of modulation used (e.g., quadrature phase shift keying (QPSK) and quadrature amplitude modulation (QAM) are different modulation techniques and QAM may be implemented using different orders corresponding to different numbers of points in the constellation, resulting in different numbers of bits transmitted per symbol) and (2) the coding rate (which typically sets out the transport block size, for example).

In various embodiments, the modulation and coding scheme used for FD communications may significantly affect the peak to average power ratio (PAPR). Therefore, even with a high-quality channel, higher-order modulation schemes may not be desirable, e.g., depending on self-interference capabilities of communicating devices. The following discussion sets out various techniques for measuring and reporting channel quality, which may be used to determine a modulation and coding scheme for FD wireless communications.

Exemplary FD Radio System

FIG. 2 shows a device 200 configured to perform FD radio communications, according to some embodiments. Device 200 may be a base station or a user mobile device, for example. The exemplary embodiment of FIG. 2 is shown for illustrative purposes and is not intended to limit the scope of the present disclosure. Device 200, in some embodiments, is configured to measure wireless channel quality, report wireless channel quality indicators, and/or determine an adaptive channel modulation and coding scheme (AMC) based on channel quality information.

In the illustrated embodiment, device 200 includes real-time controller 250, digital signal processor (DSP) 205, RF cancelation circuitry 210 (which may be configured similarly to the analog RF cancelation circuitry 110 of FIG. 1), PA 220, LNA 230, mixer circuitry, a voltage controller oscillator (VCO), DAC 240, and ADC 245.

The VCO and mixer circuitry may be configured to perform up-conversion from a baseband frequency for RF transmissions and down-conversion of received RF signals to the baseband frequency, as is well-understood by those of skill in the art. DAC 240 may be configured to generate analog signals at the baseband frequency while ADC 245 may be configured to generate digital samples based on analog signals at the baseband frequency.

Real-time controller 250, in the illustrated embodiment, includes a data bit generator unit 255 configured to generate digital data to be wirelessly transmitted and bit error rate (BER) and throughput calculator 260 configured to determine wireless error and throughput information, in the illustrated embodiment.

In the illustrated embodiment, DSP 205 is configured to perform baseband signal processing and digital self-interference cancelation (SIC) and includes reference generator 272, modulator 274, interleaver 276, IFFT and CP insertion unit 278, low-pass filter (LPF) 280, FFT and CP removal unit 282, time synchronization units for self-interference (SI) and desired signals 284 and 286, demultiplexer 288, channel estimators for SI and desired signals 290 and 292, and digital SIC unit 294.

For signals to be transmitted, in the illustrated embodiment modulator 274 is configured to modulate the data bits, after which interleaver 276 is configured to mix the modulated data bits with reference data (e.g., for pilot symbols) generated by reference generator 272. IFFT and CP insertion unit 278 is then configured to perform an inverse FFT on the output of interleaver 276 and insert cyclic prefix information, then transmit the result to DAC 240 for amplification and eventual transmission.

For received signals, in the illustrated embodiment, signals from ADC 345 are processed through LPF 280 for time synchronization in units 284 and 285. The desired signal is then transformed by FFT and its cyclic prefix is removed by unit 282. Demultiplexer 288 then extracts the symbols on pilot subcarriers, which are used to estimate the channel for SI signals and desired signals. Digital SIC unit 294 is then configured to cancel SI signals based on the estimated residual SI signal in order to obtain desired received signals.

Exemplary Channel Quality Reporting

Figure 3:
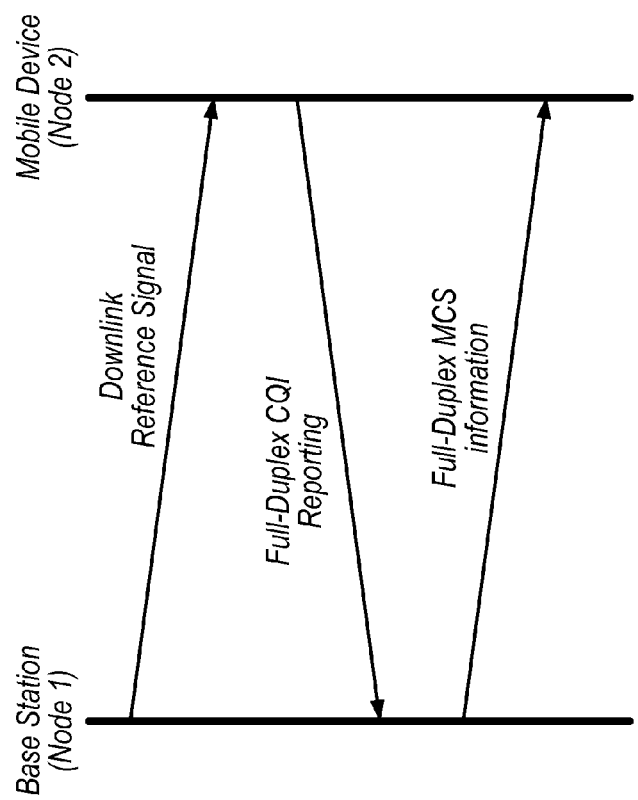
FIG. 3 is a communications diagram illustrating exemplary channel quality reporting, according to some embodiments.

FIG. 3 shows exemplary communications between a base station and a mobile device including CQI reporting. For convenience, the base station may also be referred to herein as node 1 and the mobile device referred to as node 2. In other embodiments, the mobile device may perform all or a portion of node 1 functionality and the base station may perform all or a portion of node 2 functionality described herein.

Figure 4:
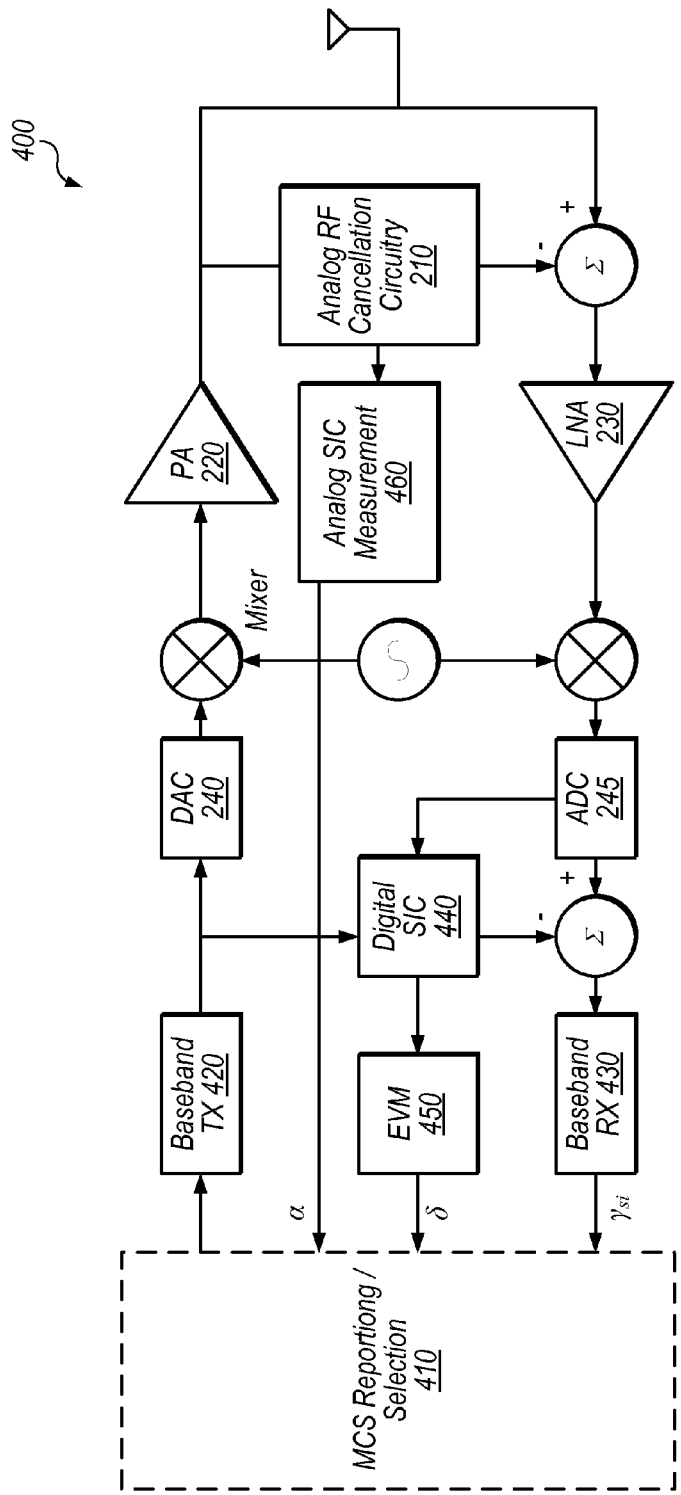
FIG. 4 is a block diagram illustrating exemplary circuitry configured to measure self-interference cancelation levels, according to some embodiments.

The base station and/or the mobile device may include various processing elements shown in FIGS. 2 and 4. In the illustrated embodiment, the base station transmits a downlink reference signal to the mobile device. The mobile device then performs measurements based on the reference signal and transmits FD CQI reporting information back to the base station. In various embodiments, this CQI information is based on measured SIC levels. The base station then determines a modulation and coding scheme (MCS) and transmits this information to the mobile device. The base station and mobile device may then use the MCS for subsequent communications over a given time interval.

In some embodiments, uplink reference symbols are not needed, as both the base station and the mobile device will experience similar channel conditions because they share time slots and frequency resources in FD radio communications. The following discussion introduces various measurements and parameters utilized in CQI reporting, according to some embodiments, and then provides further explanation as to what these parameters represent and how these parameters are determined.

In some embodiments, the mobile device is configured to measure one or more of the following parameters, singly or in combination:

$P_{R2}$: Received power for signal of interest at node 2
$P_{I2}$: Sum power of interferences from other devices at node 2
$P_{n2}$: Noise power at node 2
$P_{SI2}$: Self-interference power at full duplex node 2
$P_{T2}$: Transmit power at full duplex node 2
$P_{rsd,2}$: Residual SI power at full duplex node 2 (before ADC)

In some embodiments, these measurements are in units of Watts (W), but other units may be used in various embodiments.

In some embodiments, based on the measurements, the mobile device is configured to determine one or more of the following parameters, singly or in combination:

$\alpha_2$: Analog SIC level at full duplex node 2
$\delta_2$: Digital SIC level at full duplex node 2
$\gamma_{si,2}$: Effective SINR including SI at full duplex node 2 (before SIC)
$\gamma_{sic,2}$: Effective SINR at full duplex node 2 (after SIC)

In some embodiments, these parameters are measured in decibels (dB), but other units may be used in various embodiments. In some embodiments, the mobile device is configured to transmit information indicating these parameters (e.g., CQI information), singly or in combination, to the base station.

In some embodiments, based on the received parameters, the based station is configured to determine one or more of the following parameters, singly or in combination:

R: Spectral efficiency for a full duplex link
$R_{UL}$: Spectral efficiency for full duplex node 1
$R_{DL}$: Spectral efficiency for full duplex node 2

In some embodiments, the base station is configured to select one or more MCSs based on these parameters. In some embodiments, these measurements are in units of bits per second per Hertz (bps/Hz), but other units may be used in various embodiments.

In conventional non-FD communications a signal to interference noise ratio (SINR) at node 2 might be determined as:

$$10\log_{10}\left(\frac{P_{R2}}{P_{I2}+P_{n2}}\right) \tag{1}$$

In FD-radio embodiments, however, node 2 is also affected by its own self-interfering signals when it is transmitting. Therefore, in some embodiments, node 2 is configured to determine $\gamma_{si,2}$ according to equation (2):

$$10\log_{10}\left(\frac{P_{R2}}{P_{SI2}+P_{I2}+P_{n2}}\right) = \gamma_{si,2} \tag{2}$$

This may correspond to a measured SINR that is determined during a time interval in which node 2 is wirelessly transmitting using FD communications, based on a reference signal from node 1. Knowledge of the reference signal may be needed in order to accurately determine $P_{R2}$. This parameter $\gamma_{si,2}$ may not, however, accurately reflect the overall effective signal to noise ratio at node 2, in embodiments in which node 2 is configured to perform self-interference cancelation. Therefore, in some embodiments, node 2 is configured to determine its SIC level(s) and report CQI based on the SIC capabilities as well. For example, in some embodiments, node 2 is configured to determine its analog SIC level $\alpha_2$ according to equation (3):

$$10\log_{10}\left(\frac{P_{T2}}{P_{rsd,2}}\right) = \alpha_2 \tag{3}$$

Where $P_{T2}$ is the power of a signal transmitted by node 2 and $P_{rsd,2}$ is the residual power of the SI signal after it has been processed by analog RF cancelation circuitry 210. In this example, the analog SIC level is determined based on the power of a wireless transmission and a measured residual power for the wireless transmission, after analog self-cancelation. The residual power may be measured using any of various appropriate methods depending on the analog SIC algorithm. In various embodiments, node 2 may measure these power levels prior to, subsequent to, or during reception of the downlink reference signal.

In some embodiments, node 2 is also configured to determine its digital SIC level $\delta_2$. In some embodiments, node 2 is configured to determine this parameter using an error vector magnitude (EVM) technique based on its SIC processing. In other embodiments, node 2 may use other techniques to determine this parameter; EVM is discussed for exemplary purposes but is not intended to limit the scope of the present disclosure.

In some embodiments, node 2 is configured to transmit FD CQI reporting with information that is based on the parameters discussed above. For example, the reported effective SINR may be determined according to equation (4) below:

$$\gamma_{si,2} + \alpha_2 + \delta_2 = \gamma_{sic,2} \tag{4}$$

Node 2 may transmit $\gamma_{sic,2}$ directly (e.g., as a CQI value) or may transmit the different parameters separately. In some embodiments, node 2 may transmit different parameter values (e.g., $\gamma_{sic,2}$ values) for different modulation orders, as discussed in further detail below.

FIG. 4 is a block diagram illustrating exemplary circuitry configured to determine the various SINR parameters discussed above, according to some embodiments. In the illustrated embodiment, FIG. 4 includes several elements that are also shown in FIG. 2, and these elements may be configured as described above with reference to FIG. 2. In the illustrated embodiment, FIG. 4 also includes MCS reporting/selection block 410, baseband TX module 420, baseband RX module 430, digital SIC unit 440, EVM unit 450, and analog SIC measurement unit 460. In some embodiments, elements 420, 430, 440, and 450 are included in DSP 205 and element 460 is included in analog RF cancelation circuitry 210.

Digital SIC 440, in the illustrated embodiment, is configured to digitally cancel self-interfering signals based on information from baseband TX 420 and ADC 245 by subtracting signals from the output of ADC 245. In the illustrated embodiment, EVM module 450 is configured to determine an EVM for the digital SIC to produce a digital SIC level δ.

Analog SIC measurement unit 460, in the illustrated embodiment, includes circuitry configured to determine α, e.g., according to equation (3). Baseband RX module 430, in the illustrated embodiment, includes circuitry configured to determine $\gamma_{si}$, as well as processing received signals.

In various embodiments, measured information used to determine channel quality may be combined before reporting (e.g., by determining $\gamma_{sic,2}$ based on δ, $\gamma_{si}$, and α) or this information may be separately reported to the base station. This information may be encoded using various techniques, such as using indices corresponding to a certain range of measured values, by transmitting measured values directly, by transmitting combinations of values, etc.

MCS reporting/selection unit 410 may be included in the base station and/or in the mobile device. For example, the mobile device may generate one or more CQI values based on the determined parameters and the base station may then select one or more modulation and coding schemes based on reported CQI values.

In some embodiments, the mobile device is configured to measure $\gamma_{sic,2}$ for multiple different transmission modulation orders and report multiple CQI values based on the different measurements. In other words, the mobile device may measure $\gamma_{sic,2}^{[i]}$ for multiple values of i, where i represents modulation order. In one particular example, the mobile device may use QPSK, 16QAM, and 64QAM modulation and determine and report separate CQI values for each, based on its digital and analog SIC measurements at each modulation level. In these embodiments, the base station may determine a MCS based on multiple received CQI values for the different modulation orders. In other embodiments, mobile device may determine a single CQI value for a particular modulation order. In some such embodiments, however, the mobile device may also transmit information corresponding to its SIC capabilities. This may include for example, a classification of the mobile device into a particular class of devices within a given range of SIC capability. For example, low-power UEs may typically have lower SIC capabilities. Based on this information and a receive CQI, the base station may estimate SIC levels for the mobile devices at other modulation orders and select a MCS based on the estimation.

In some embodiments, the base station is configured to select both a UL MCS and a DL MCS (these UL and DL MCS may or may not be the same) based on the received CQI(s). In some embodiments, the base station is configured to select the UL MCS and DL MCS to maximize estimated R (the overall spectral efficiency for the full-duplex link). In some embodiments:

$$R = R_{UL}(MCS_{UL}) + R_{DL}(MCS_{DL}) \quad (5)$$

In other words, the base station may select an MCS pair (UL MCS and DL MCS) to maximize spectral efficiency. In some embodiments, the base station is configured to determine its own digital and analog SIC levels in a similar manner to the mobile device, and is configured to select a UL MCS based on this determination.

In some conventional LTE systems, an MCS is selected according to the following table:

| CQI Index | MCS Index | Modulation |
|---|---|---|
| 1-6 | 0-9 | QPSK |
| 7-9 | 10-16 | 16-QAM |
| 10-15 | 17-28 | 64-QAM |

In some embodiments, this table may be used (e.g., for DL MCS), for reported CQI indices that are be determined according to the techniques discussed above. In other embodiments, different CQI indices and/or tables may be used (and multiple CQIs may be reported for different modulation orders, as discussed above).

Once the UL and DL MCSs have been selected, they may be used for subsequent communications, e.g., until it is determined (e.g., based on subsequent CQI reporting) that another MCS is desired. CQI is discussed herein for purposes of explanation, but effective SINR may be encoded and reported using any of various types of reporting information. The discussion of CQI is not intended to limit the scope of the present disclosure.

Exemplary Methods

Figure 5:
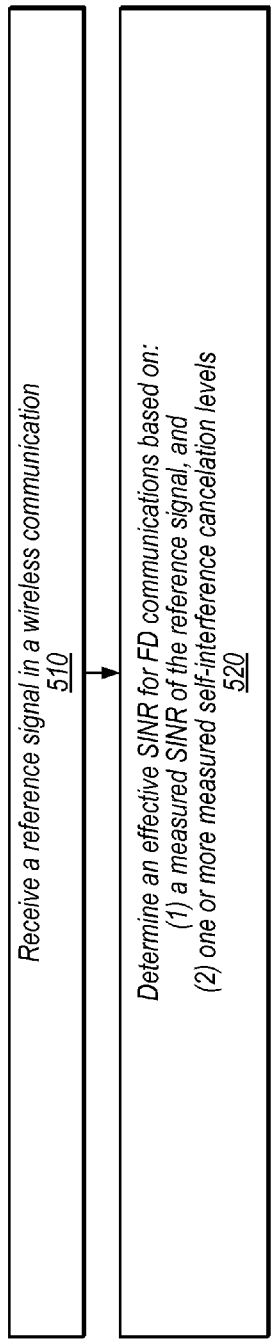
FIG. 5 is a flow diagram illustrating an exemplary method for determining effective signal to interference plus noise ratio (SINR), according to some embodiments.

FIG. 5 is a flow diagram illustrating an exemplary method for channel quality reporting for full-duplex radio communications, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

In some embodiments, the method may be performed by a cellular user equipment (UE) device. In some embodiments, the method may be performed by a cellular base station. In still other embodiments, the method may be performed by a computing device configured for non-cellular wireless communications such as WIFI, Bluetooth satellite navigation, satellite television, marine VHF radio, etc. Flow begins at 510.

At 510, a computing device (e.g., the mobile device) receives a reference signal in a wireless communication. The reference signal may be received while the computing device is also transmitting wirelessly, using FD communications.

At 520, the computing device determines an effective SINR for the FD communications based on (1) a measured SINR of the reference signal and (2) one or more measured self-interference cancelation levels. As discussed above, the SIC levels may include both digital and analog SIC levels. In some embodiments, the one or more measured SIC levels are measured during an interval in which the computing device is receiving the reference signal. For example, the computing device may transmit the signals that are measured for SIC at using time and/or frequency resources that overlap with the reference signal being received.

In some embodiments, the computing device may report the effective SINR, e.g., using a channel quality indicator. The disclosed techniques may facilitate FD communications by taking into account SIC abilities of one or both devices in communication.

Figure 6:
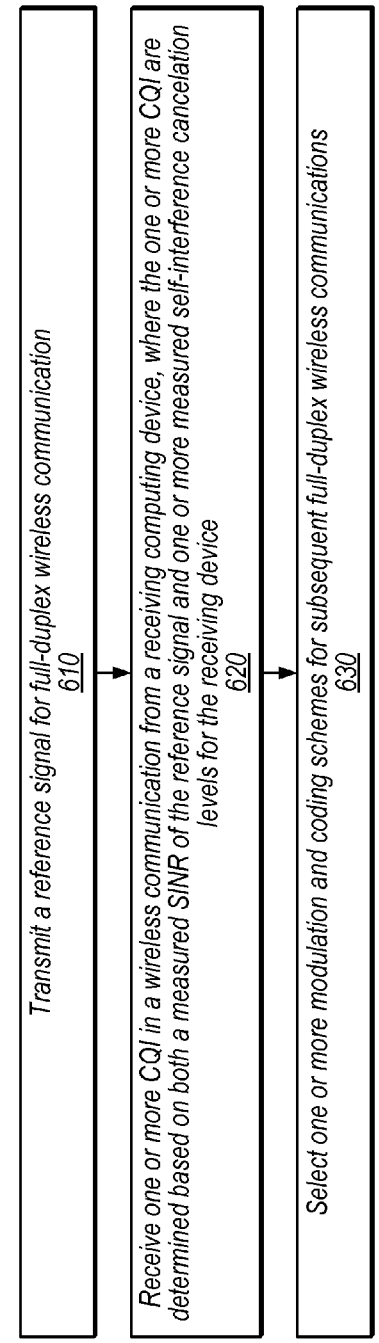
FIG. 6 is a flow diagram illustrating an exemplary method for receiving channel quality information and selecting modulation and coding scheme(s), according to some embodiments.

FIG. 6 is a flow diagram illustrating an exemplary method for channel quality reporting for full-duplex radio communications, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

In some embodiments, the method may be performed by a cellular user equipment (UE) device. In some embodiments, the method may be performed by a cellular base station. In still other embodiments, the method may be performed by a computing device configured for non-cellular wireless communications such as WIFI, Bluetooth satellite navigation, satellite television, marine VHF radio, etc. Flow begins at 610.

At 610, a computing device (e.g., the base station) transmits a reference signal for FD wireless communication.

At 620, the computing device receives one or more channel quality indicators in a wireless communication from the receiving computing device that received the reference signal. In the illustrated embodiment, the one or more CQI are determined based on both a measured SINR of the reference signal by the receiving device and one or more measured SIC levels for the receiving device.

At 630, the computing device selects one or more modulation and coding schemes for subsequent FD wireless communications. In some embodiments, the computing device may select different modulation and coding schemes for UL and DL transmissions, e.g., based on the SIC capabilities of the devices in communication.

The disclosed techniques may be used for any of various types of FD wireless communications, including but not limited to cellular communications. Thus, the disclosed techniques may be used for wireless communications between a UE and a base station, between mobile devices, between non-mobile computing devices, between an access point and a base station, between an access point and a mobile device, etc., without limitation.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
one or more processing elements including analog self-interference cancelation (SIC) circuitry and one or more digital SIC processing elements, wherein the one or more processing elements are configured to:
receive a reference signal in a wireless communication; and
determine an effective signal to interference plus noise ratio (SINR) for full-duplex (FD) communications, based on the reference signal, wherein the effective SINR for FD communications is based on:
a measured SINR of the reference signal; and
one or more measured self-interference cancelation (SIC) levels that include an analog SIC level generated by the analog SIC circuitry and a digital SIC level generated by the one or more digital SIC processing elements, wherein the analog SIC level is determined based on power of a wireless transmission by the apparatus and a measured residual power of the wireless transmission after analog self-interference cancelation.

2. The apparatus of claim 1, wherein the apparatus is configured to determine the measured SINR during a time interval in which the apparatus is configured to wirelessly transmit using time and frequency resources that at least partially overlap with time and frequency resources of the reference signal.

3. The apparatus of claim 1, wherein the apparatus is configured to determine the digital SIC level based on error vector magnitude (EVM).

4. The apparatus of claim 1, wherein the apparatus is configured to transmit information that indicates the effective SINR and wherein the information is usable to determine one or more modulation and coding schemes for subsequent wireless communications with the apparatus.

5. The apparatus of claim 1, wherein the apparatus is configured to determine multiple effective SINRs based on determined SIC levels corresponding to multiple different modulation orders used for wireless transmission.

6. The apparatus of claim 5, wherein the multiple different modulation orders include two or more quadrature amplitude modulation (QAM) orders.

7. A method, comprising:
transmitting, by a computing device, a reference signal for full-duplex (FD) wireless communication;
receiving, by the computing device, one or more channel quality indicators in a wireless communication from a receiving computing device that received the reference signal, wherein the one or more channel quality indicators are determined based on both a measured SINR of the reference signal and one or more measured self-interference cancelation (SIC) levels for the receiving computing device; and
selecting, by the computing device, one or more modulation and coding schemes for subsequent FD wireless communications based on the one or more channel quality indicators, wherein the one or more modulation and coding schemes include a first modulation and coding scheme for transmissions from the receiving device and a second modulation and coding scheme for transmissions to the receiving device, wherein the first and second modulation and coding schemes are different modulation and coding schemes, and wherein the selecting is performed based on overall spectral efficiency for FD wireless communications with the receiving device.

8. The method of claim 7, further comprising:
determining, by the computing device, one or more SIC levels of the computing device;
wherein the one or more modulation and coding schemes include a first modulation and coding scheme for transmissions from the receiving device and a second modulation and coding scheme for transmissions to the receiving device; and
wherein the selecting of the second modulation and coding scheme is based on the determined one or more SIC levels.

9. The method of claim 7,
wherein the one or more channel quality indicators include multiple channel quality indicators corresponding to different modulation orders for transmissions from the receiving device, the method further comprising:
selecting the one or more modulation and coding schemes based on the multiple channel quality indicators.

10. The method of claim 7, further comprising:
receiving information indicating a SIC classification for the receiving computing device; and
estimating one or more channel quality indicators for the receiving device based on the SIC classification and the one or more received channel quality indicators;
wherein the selecting is based on the estimated one or more channel quality indicators.

11. A non-transitory computer-readable medium having instructions stored thereon that are executable by a computing device to perform operations comprising:
receiving a reference signal in a wireless communication; and
determining an effective signal to interference plus noise ratio (SINR) for full-duplex (FD) communications, based on the reference signal, wherein the effective SINR for FD communications is based on:
a measured SINR of the reference signal; and
one or more measured self-interference cancelation (SIC) levels that include an analog SIC level generated by analog SIC circuitry of the computing device and a digital SIC level generated by one or more digital SIC processing elements of the computing device, wherein the analog SIC level is determined based on power of a wireless transmission by the computing device and a measured residual power of the wireless transmission after analog self-interference cancelation.

12. The non-transitory computer-readable medium of claim 11, wherein the operations further comprise determining the digital SIC level using an error vector magnitude (EVM) determination.

13. The non-transitory computer-readable medium of claim 11, wherein the operations further comprise transmitting information that indicates the effective SINR and wherein the information is usable to determine one or more modulation and coding schemes for subsequent wireless communications with the computing device.

14. The non-transitory computer-readable medium of claim 13, wherein the information that indicates the effective SINR is a channel quality indicator (CQI).

15. The non-transitory computer-readable medium of claim 11, wherein the operations further comprise determining multiple effective SINRs based on determined SIC levels corresponding to multiple different modulation orders used for wireless transmission.

16. A method, comprising:
transmitting, by a computing device, a reference signal for full-duplex (FD) wireless communication;
receiving, by the computing device, one or more channel quality indicators in a wireless communication from a receiving computing device that received the reference signal, wherein the one or more channel quality indicators are determined based on both a measured SINR of the reference signal and one or more measured self-interference cancelation (SIC) levels for the receiving device;
determining, by the computing device, one or more SIC levels of the computing device; and
selecting, by the computing device, one or more modulation and coding schemes for subsequent FD wireless communications based on the one or more channel quality indicators and the determined one or more SIC levels of the computing device, wherein the one or more modulation and coding schemes include a first modulation and coding scheme for transmissions from the receiving device and a second modulation and coding scheme for transmissions to the receiving device.

17. A method, comprising:
transmitting, by a computing device, a reference signal for full-duplex (FD) wireless communication;
receiving, by the computing device, one or more channel quality indicators in a wireless communication from a receiving computing device that received the reference signal, wherein the one or more channel quality indicators are determined based on both a measured SINR of the reference signal and one or more measured self-interference cancelation (SIC) levels for the receiving device, wherein the one or more channel quality indicators include multiple channel quality indicators corresponding to different modulation orders for transmissions from the receiving device; and
selecting, by the computing device, one or more modulation and coding schemes for subsequent FD wireless communications based on the multiple channel quality indicators.

* * * * *